Dec. 25, 1962 A. A. ROOT 3,069,725
APPARATUS AND METHOD FOR MAKING FOAMED PLASTIC CONTAINERS
Filed April 3, 1959 9 Sheets-Sheet 1

INVENTOR
ANDREW A. ROOT
BY
Louis L. Gagnon
ATTORNEY

INVENTOR
ANDREW A. ROOT
BY
Louis L. Gagnon
ATTORNEY

INVENTOR
ANDREW A. ROOT
BY
ATTORNEY

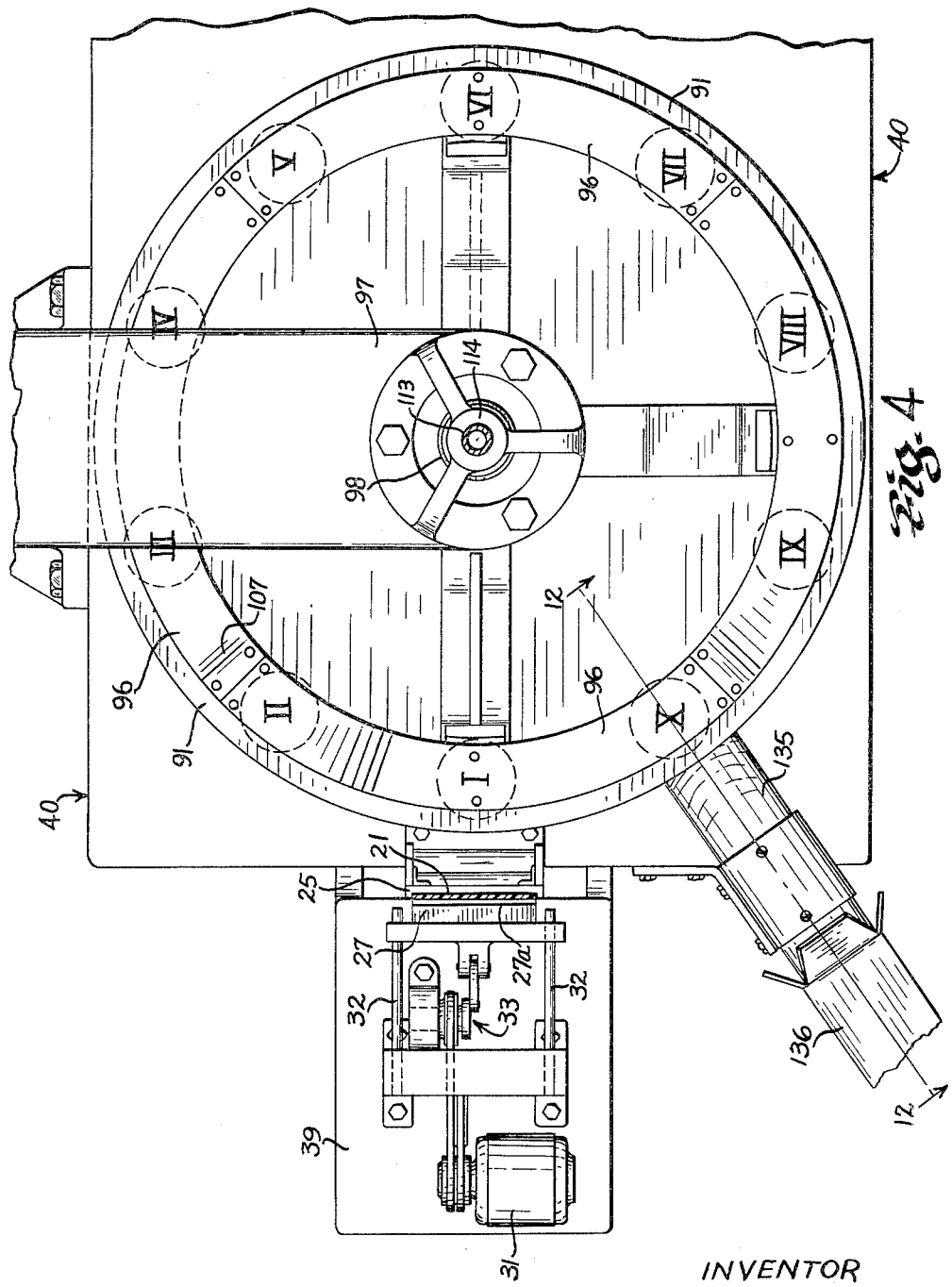

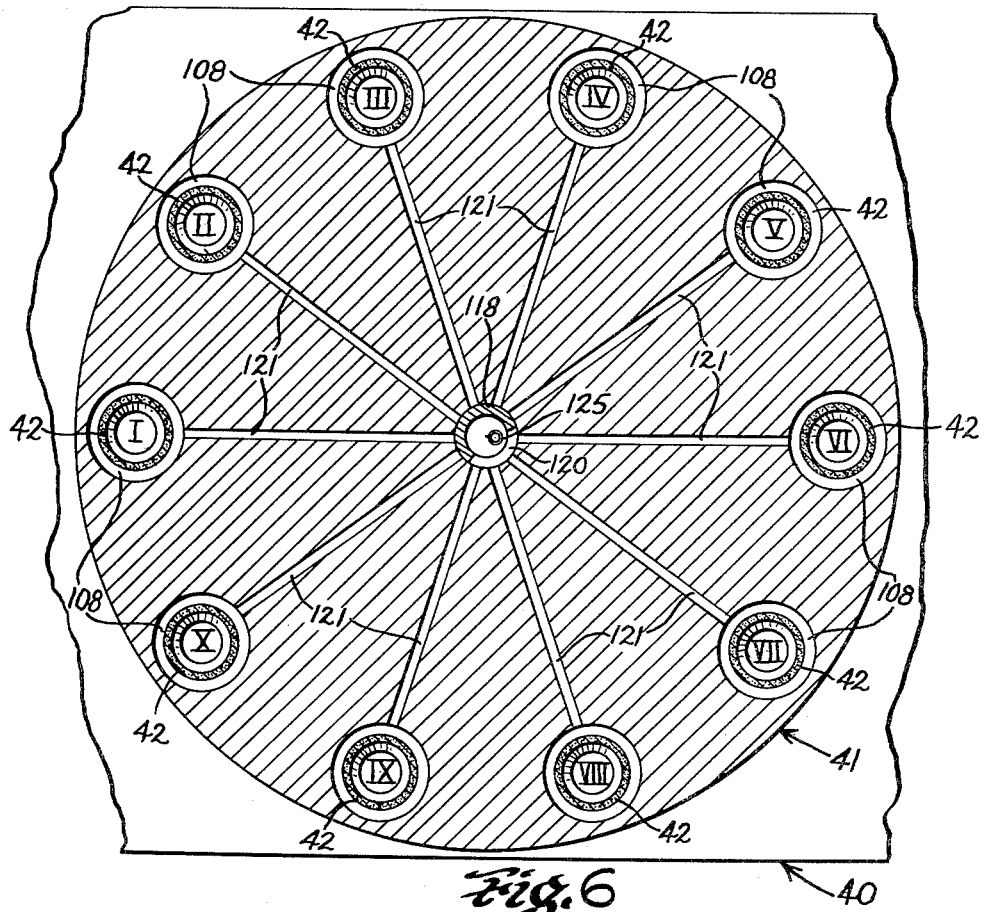
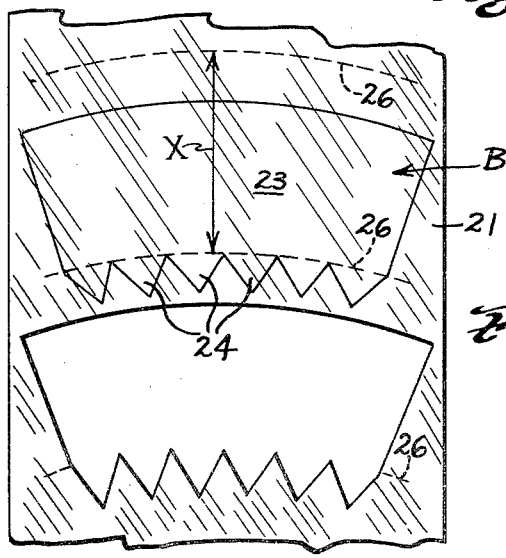

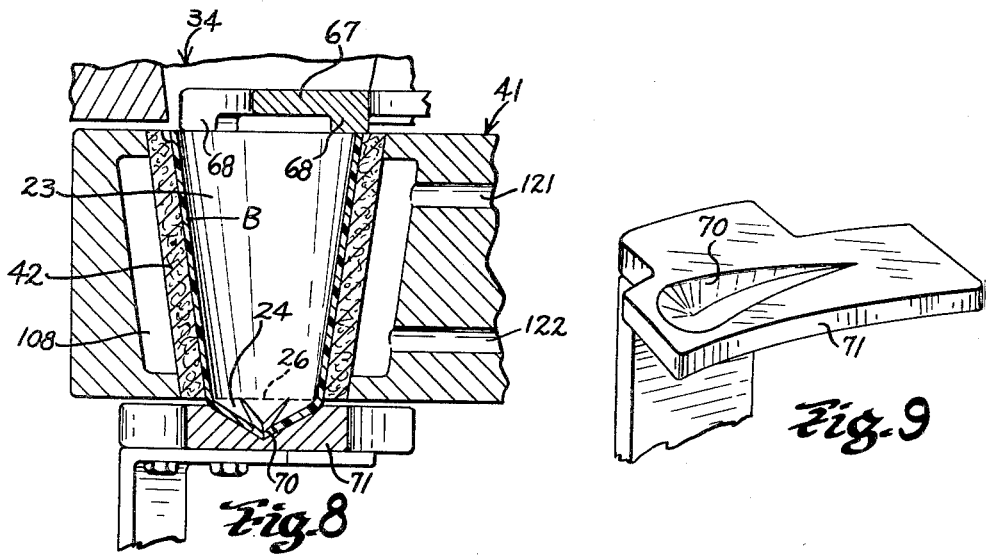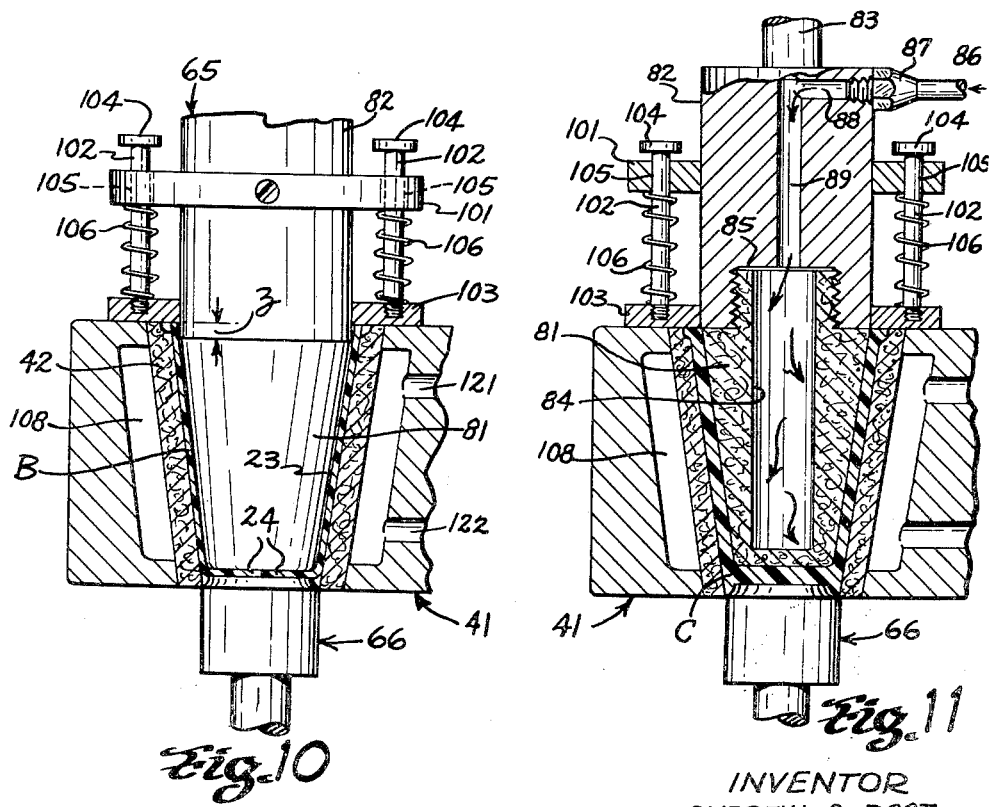
INVENTOR
ANDREW A. ROOT
BY
*Louis L. Gagnon*
ATTORNEY

INVENTOR
ANDREW A. ROOT
BY
Louis L. Gagnon
ATTORNEY

INVENTOR
ANDREW A. ROOT
BY
*Louis L. Gagnon*
ATTORNEY

Dec. 25, 1962 A. A. ROOT 3,069,725
APPARATUS AND METHOD FOR MAKING FOAMED PLASTIC CONTAINERS
Filed April 3, 1959 9 Sheets-Sheet 9

INVENTOR
ANDREW A. ROOT
BY
*Louis L. Gagnon*
ATTORNEY

United States Patent Office 3,069,725
Patented Dec. 25, 1962

3,069,725
APPARATUS AND METHOD FOR MAKING
FOAMED PLASTIC CONTAINERS
Andrew A. Root, Shrewsbury, Mass.
Filed Apr. 3, 1959, Ser. No. 803,860
5 Claims. (Cl. 18—20)

This invention relates to the manufacture of containers and has particular reference to a novel means and method for making disposable individual service cups, boxes or the like from initially relatively thin and flexible sheetlike thermoplastic materials which are characterized in that they may be expanded and reformed to a desired shape at temperatures above those of the contents which are to be ultimately put in said containers and permanently set to retain a desired shaped and expanded condition when subsequently cooled to temperatures below that required to render the same thermoplastic.

Disposable individual service containers such as cups, plates, boxes or the like which are commonly used to serve or package a wide variety of things including solids or liquids, such as hot and cold drinks, foodstuffs or the like are most commonly formed of paper which is usually intially blanked and thereafter pressed, folded and/or rolled to a desired shape.

In general, the fabricating of such containers usually involves the forming of seams to connect the various sections of the containers together and it has been the practice to form such seams or connections with adhesives or to employ various pleatings or gatherings and compressing techniques which complicate the manufacture of the containers and consequently increase their manufacturing costs. Moreover, paper containers which are to be used for hot contents or liquids must, of necessity, be formed of heavier or thicker material than is conventionally used for other liquids or solids or alternatively the containers must be formed of multiple thicknesses of the thinner paper.

In the latter case the added paper and relatively complicated procedures required to form such containers render their manufacture economically undesirable. Furthermore, the use of single layer heavier paper has not been found to be entirely satisfactory since the heavier material tends to uncurl and/or unglue thereby separating at the seams which results in leakage particularly when hot liquids are supported in the containers. The tendency for the heavy paper to uncurl or become unglued is aggravated by hot liquids.

In an effort to overcome the above-mentioned and other well-known difficulties encountered in the manufacture of paper containers, disposable cups, plates and boxes or the like have been formed of a variety of plastic materials by molding techniques. While such containers can be formed seamless and of various desired thicknesses, the cost of plastic materials, along with that of the relatively complicated molding equipment required to mass produce the containers, has been such as to render the end products generally much more expensive to manufacture than comparable paper products.

The present invention overcomes the above-discussed drawbacks common to the manufacture of conventional paper or plastic containers and has for its principal object novel means and method of making the improved above-mentioned containers from expandable sheetlike initially relatively thin and flexible thermoplastic material.

Another object is to provide apparatus and method for making improved and novel inexpensive containers or articles of the above character from a unicellular expandable thermoplastic sheetlike material wherein, during the fabrication of an article, said material is rendered thermoplastic and fusable to form an integral structure while simultaneously being caused to assume a precontrolled shape by self-expansion to enlarge the cellular structure of said material and thereby substantially reduce its thermal conductivity to provide said article with said efficient heat and cold insulating properties.

Another object is to provide novel means and method for making rigid and durable containers from fusable materials of the above described character wherein the adjoining sections or seams of said containers are sealed by fusion and thereby permanently secured against separation from each other.

Another object is to provide automatic means for economically mass producing articles of the above character.

Other objects and advantages of the invention will become apparent from the following description when taken in conjunction with the accompanying drawings in which:

FIG. 4 is a top plan view of the apparatus of FIGS. 1 and 1A;

FIG. 6 is a horizontal cross-sectional view taken substantially along line 6—6 of FIG. 1 looking in the direction of the arrows;

FIG. 7 is a fragmentary elevational view of a weblike member from which articles embodying the invention are formed, said figure being taken along line 7—7 in FIG. 1 looking in the direction of the arrows;

FIG. 8 is a fragmentary vertical cross-sectional view taken along line 8—8 of FIG. 5 looking in the direction of the arrows;

FIG. 9 is a perspective view of a prefolding member which is a part of the apparatus of FIG. 1 and is located adajacent the position at which the cross-section of FIG. 8 is taken;

FIG. 10 is a fragmentary vertical cross-sectional view taken substantially along line 10—10 of FIG. 5 looking in the direction of the arrows;

FIG. 11 is a fragmentary vertical cross-sectional view taken substantially along line 11—11 of FIG. 5 looking in the direction of the arrows;

In broadly outlining the present invention which involves the making of disposable or individual service-type containers, it will be noted that the apparatus shown in FIGS. 1–14 relates more specifically to the forming of drinking cups or the like from body blanks B which are successively punched by a blanking die 20 from a vertically disposed relatively thin web 21 of expandable thermoplastic material which is fed past the die 20 after being extruded in sheet form from an extruder 22.

The web 21 is preferably formed by extrusion from thermoplastic polystyrene beads or pellet material or the like known commercially as Dylite and manufactured by Koppers Company of Pittsburgh, Pennsylvania. The polystyrene beads or pellets, when heated to fusable temperatures inherently individually expand and unite with each other to form a contiguous rigid unicellular structure having exceptional thermal insulating properties. When extruded in sheet form by conventional plastic extruding techniques and with the usual apparatus which, for purposes of illustration, is diagrammatically shown as 22 in FIG. 1, the finally formed sheet or web 21 may, in itself, be again rendered thermoplastic at which time a further blowing up or expansion of the unicellular material of the web 21 will automatically take place.

Figure 1:
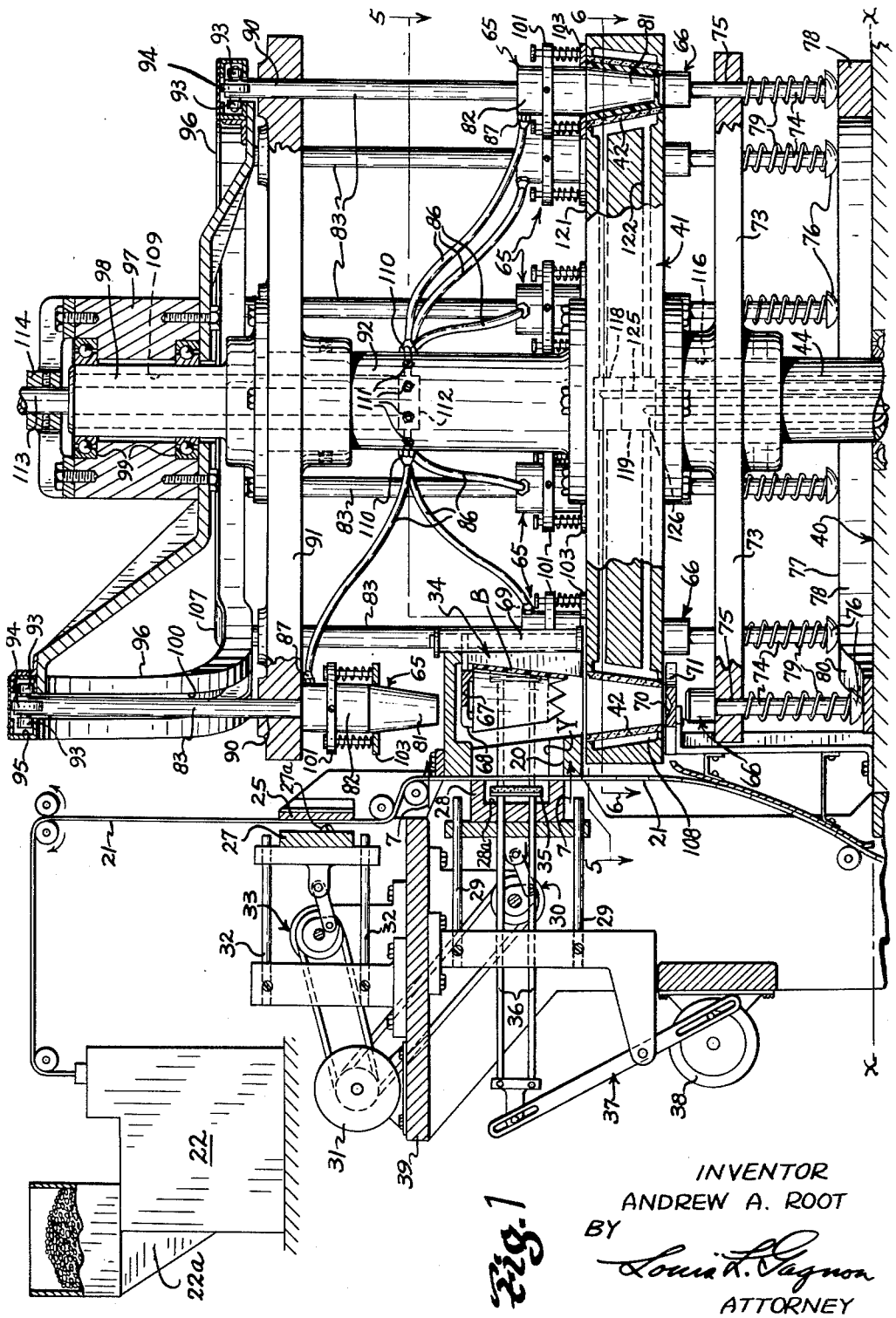
FIG. 1 is a side elevational view diagrammatically illustrating the upper section of apparatus embodying the invention with various parts thereof shown in vertical cross-section.

In utilizing these features of the material of the web 21, the present invention contemplates, broadly, the preforming of the body blanks B loosely within the confines of individual mold-like members, such as shown more particularly in FIGS. 1 and 8, to substantially the shape desired of the finally formed products and thereafter heating said preformed blanks while confined within said moldlike members (see FIG. 11) to render the material thereof thermoplastic whereupon expansion of the material of the blanks will inherently take place to cause the same to fill out said moldlike members. At the same time, an integral structure will result from simultaneous fusion of the adjoining parts of the preformed blanks.

The shape of the containers thus formed will be controlled in accordance with the precontrolled shape of the internal cavities of the moldlike members and the expansion of the material of the blanks will automatically enlarge the structure of the cells of said material to decrease its thermal conductivity and thereby provide the container with highly efficient heat and cold insulating properties. Upon being expanded and fused to the desired ultimate shape within the moldlike members, the containers are cooled at least to the point where the material thereof is self-supporting and thereafter ejected from the moldlike members (see FIG. 12).

In order to economically mass produce containers of the above-described general type, the present invention features novel means illustrated in the drawings for automatically continuously forming the improved containers of the invention as discussed briefly hereinabove and the forming of drinking cups or the like will first be described in detail with relation to the apparatus of FIGS. 1–14.

By referring more particularly to FIG. 1, it will be seen that the sheetlike material or web 21 is fed directly from the extruder 22 to the container-forming mechanism. While the web 21 may be extruded separately and stocked in roll form to be subsequently used to feed the container-forming mechanism, the above arrangement permits the forming of the containers from stock material in pellet form of the type described hereinabove. With the arrangement shown in the drawings, the Dylite or polystyrene pellets are placed in the hopper 22a as needed by controlled operation of the extruder 22, the web 21 is extruded at a continuous rate which is timed in accordance with the cycling of the container-forming mechanism, to be described in detail hereinafter.

The web 21 is preferably formed to a width only slightly greater than that of the body blanks B and the rate of extrusion of the web is controlled to cause the successive punchings which form the body blanks B to take place in close adjacent relation with each other approximately as illustrated in FIG. 7 so as to minimize waste. It is pointed out at this time that the web 21 may be formed to any desired thickness and if desired, it may be formed as a multiple layer structure with or without reinforcing means such as fabric or other relatively thin metallic or nonmetallic meshlike material sandwiched or laminated between the layers. In the forming of drinking cups or the like, it has been found that reinforcement of the material of the web 21 is, in most instances, unnecessary and a web having a thickness of approximately $\frac{1}{32}''$ can be used to produce a very desirable and highly efficient expanded end product such as a cup or the like having a final wall thickness of approximately $\frac{3}{16}''$. It should, of course, be understood that the dimensions given above are only illustrative as are the proportions of the containers shown in the drawings wherein said containers are illustrated in various stages of construction.

In the case illustrated in FIGS. 1–12 of the drawings, the cups C (see FIG. 12) are formed entirely from a onepiece body blank B such as illustrated in FIG. 7 wherein the major part 23 of the blank ultimately becomes the side wall part of a cup and the triangular shaped lower tablike parts 24 of the blank are folded inwardly towards each other to form the base or bottom part of the cup as will be described in greater detail hereinafter.

In order to assure a proper folding of the tablike parts 24, the web 21 is directed over a platen 25 at which point it is scored along the dash line 26 by a scoring punch 27. The scored lines 26 are placed on the web 21 in such locations as to be in proper registry with the blanking die 20 at the time a body blank B is punched so as to cause each body blank B to bear the scoring 26 at the location where the tablike parts 24 are to be subsequently folded (see FIG. 7).

By operating the blank punching apparatus simultaneously with the actuation of the scoring punch 27 so as to cause a score mark 26 to be formed on the web 21 each time a blank B is punched, registry of the scored lines 26 on the web 21 is accomplished by spacing the scoring or stamping part 27a of the scoring punch 27 at a distance X (see FIG. 7) or at distances equal to multiples of X from the point Y (see FIG. 1) on the punching die at which the scored lines 26 are to be located when the blank is punched. For convenience of illustration in FIG. 1, this distance has been shown as being approximately 3X.

The punching of the body blanks B is performed in the usual manner by forcing a punch member 28 against the web 21 and into the die 20 thereby cutting the blank B from the web 21. The punch 28 is accurately guided by rods 29 which are rigidly supported in aligned relation with the die 20 and said punch 28 is actuated by an eccentric camlike mechanism 30 which is driven by a suitable motor or the like 31. The scoring die 27 is also similarly accurately guided by fixed rod members 32 and actuated by an eccentric cam mechanism 33 which is driven in synchronism with the camlike mechanism 30 preferably by the same motor 31.

It should be understood that the scoring and punching of the blanks may be performed as a single operation by combined scoring and punching means.

After having been punched, each body blank B is pushed, in a direction normal to its plane, into a conically shaped receptacle 34 having a side portion opening into the cavity of the die 20. A pusher 35, guided by rods 36 which pass through the punch 28, is used for this operation and is actuated by an intermittently operated combined lever arm and cam mechanism 37 which is driven by a motor or the like 38. The actuating mechanism for the pusher 35 is operated in synchronism with the scoring and blanking punches 27 and 28, respectively, in such a timed sequence as to push the body blank B into the receptacle 34 immediately after being blanked and to retract back into the internal cavity portion 28a of the punch 28, as shown in FIG. 1, before the next successive blanking operation. It is pointed out that the entire apparatus for scoring, blanking and pushing the blanks B, including the receptacle 34, is supported by a rigid bracketlike member 39 which is attached to the main base part 40 of the container forming apparatus.

On the base 40 there is rotatably supported a turret or flat circular tube 41 having a plurality of female forming molds 42 each having a shape simulating an inverted frustum of a cone adjacent its outer peripheral edge portion. The said molds 42 are adapted to each receive a body blank B from the receptacle 34. The table 41 is positioned so as to have its axis of rotation substantially parallel to the axis of the conical receptacle 34 with its flat upper surface closely adjacent to the underside of said receptacle so as to permit the outermost part of the table 41 to be freely rotated past the receptacle 34 with a minimum of clearance therebetween.

The molds 42 are open at both ends and extend vertically completely through the thickness of the table 41 and are disposed with their axes at equally spaced distances from each other about a circular path concentric with the axis of the table 41. The radius of said circular path is substantially equal in length to the distance between the respective axes of the receptacle and table. In this manner, it can be seen that rotation of the table 41 about its axis will cause the receiving molds 42 therein to each successively become registered or in axial alignment with the receptacle 34 which, as stated above, is stationary.

Figure 1A:
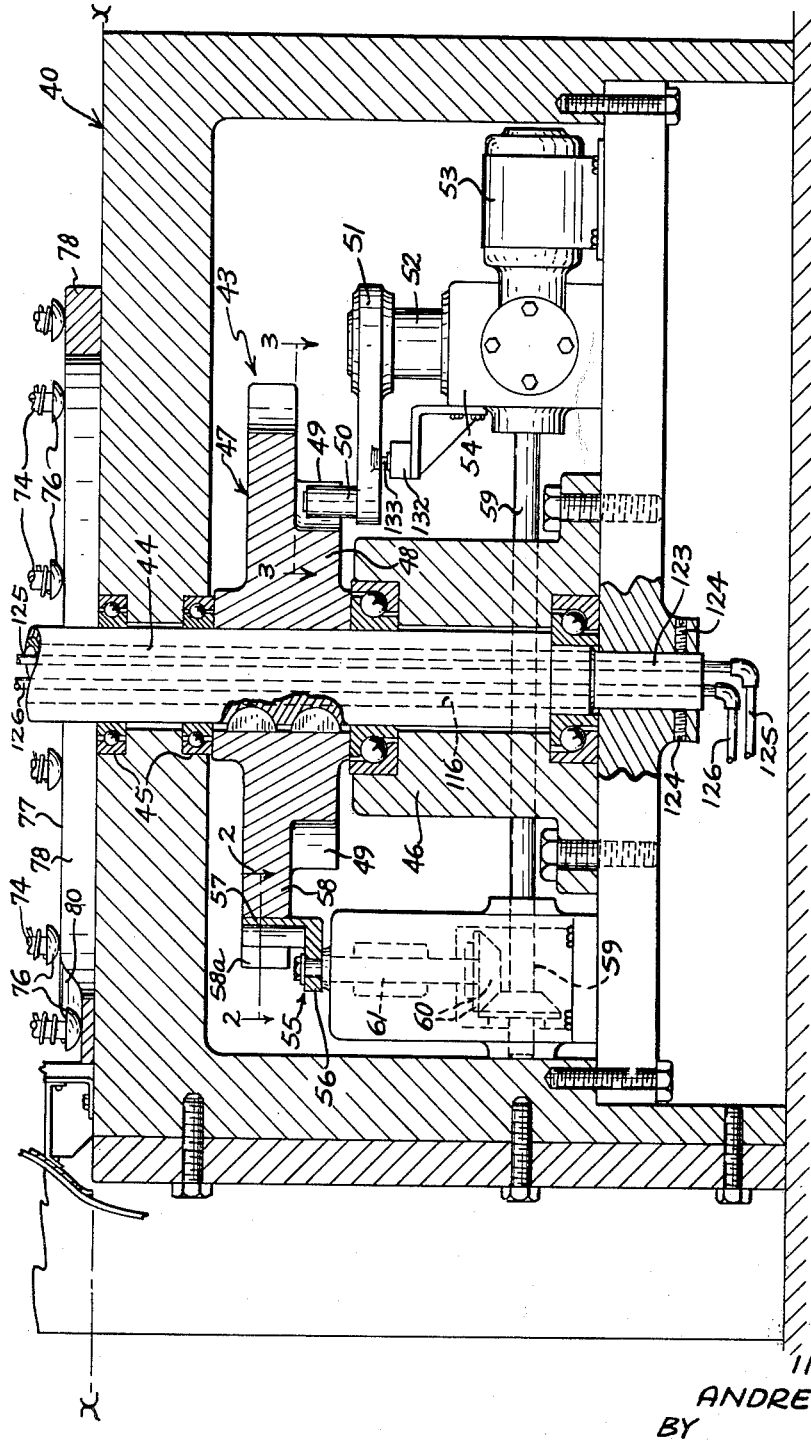
FIG. 1A is a continuation of FIG. 1 showing the lower section of the apparatus and giving the complete side elevation when matched with FIG. 1 along the lines x—x.

In operation, the table 41 is indexed or rotated intermittently by an indexing drive mechanism 43 housed within the base of the apparatus (see FIG. 1A) so as to automatically locate the individual receiving molds 42 successively in axial alignment with the receptacle 34 and to hold the same in registry with the receptacle 34 for a controlled time period sufficient to permit a single body blank B to be inserted from the receptacle 34 into each of the receiving molds 42 in a manner to be described more in detail hereinafter.

The table 41 is supported by a vertically disposed hollow shaft 44 which extends through journalling 45 in the upper portion 40a of the base 40 and is rotatably seated at its lowermost end in a bearing block 46. The indexing mechanism 43 embodies a Geneva type drive arrangement wherein a sprocketlike disc 47 is rigidly secured to the shaft 44. The disc 47 embodies a lower annular toothed section 48 having equally radially spaced teeth 49 which are equal in number to the number of forming molds 42 in the table 41. The teeth 49 are successively intermittently engaged by the drive pin 50 of a continuously rotating actuating cam 51 which is so positioned relative to the disc 47 as to cause the drive pin to engage one of the teeth 49 with each 360° revolution of the cam 51 (see FIG. 2) and thereby cause the disc 47 to be rotated an amount which will move a forming mold 42 in the table 41 out of axial alignment with the receptacle 34 and position the next successive or adjacent forming mold into axial alignment with the receptacle 34.

The disc 47 is so prealigned relative to the table 41 as to cause a forming mold 42 to be accurately axially aligned with the receptacle 34 at the completion of each intermittent rotation of the disc 47 by the cam 51. The drive pin 50 of the cam 51 is brought successively and intermittently into and out of engagement with the toothed section 48 (see FIG. 2) by continued rotation of the cam about the vertical axis of a supporting shaft 52 which is rotatably driven by a motor 53 through a conventional gear reduction arrangement 54. By indexing the table 41 in the above manner, a desired increment of time permitting the loading of the body blanks B into the forming molds 42 is provided by controlling the speed of rotation of the cam 51 which is governed by the selection of reduction gearing in the box 54. It will become apparent hereinafter that the time interval between the table indexing cycles is also used to advantage in the performance of the various cup forming operations which take place subsequent to the loading of the body blanks B into the forming molds 42.

In order to prevent radial movement or accidental displacement of the table 41 during the time interval between indexing, that is, when the cam drive pin 50 is out of engagement with the teeth 49 of the disc 47, an automatically intermittently operating lock mechanism generally indicated by 55 is provided in the base 40 which holds the disc 47 in a fixed rotated position between the table indexing cycles and releases the disc 47 at the time it is to be indexed by the cam 51. The lock mechanism embodies a rotatable member 56 having a shell-like cylindrically shaped segment 57 which is adapted to be intimately fitted between the teeth of an upper sprocketlike toothed section 58 of the disc 47 (see FIG. 2). The number of teeth 58a in the section 58 of the disc 47 equals the number of teeth in the section 48 thereof. The member 56 is rotated synchronously with cam 51 by means of a laterally extending shaft 59 which is geared to the motor 53 through the gear box 54 and interconnected with bevel gears or the like 60 to a vertically extending shaft 61 having the member 56 keyed to its uppermost end.

Figure 2:
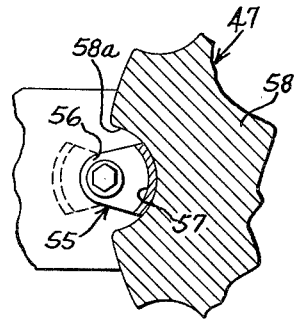
FIG. 2 is a fragmentary cross-sectional view taken on line 2—2 of FIG. 1A looking in the direction of the arrows.
Figure 3:
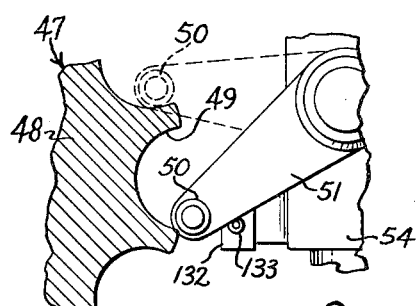
FIG. 3 is a fragmentary cross-sectional view taken on line 3—3 of FIG. 1A looking in the direction of the arrows.

Rotation of the member 56 is synchronized with the rotation of the cam 51 so as to cause the member 56 to be out of engagement with the teeth 58a of the disc 47, as shown by the dot-dash outline in FIG. 2, during the time the cam drive pin 50 is in engagement with the teeth 49 of the disc, as shown in FIG. 3. When the cam drive pin 50 moves out of engagement with the teeth 49, the segment 57 of the member 56 meshes with the teeth 48 as shown by full lines in FIG. 2 to lock and hold the table 41 at the indexed position shown in FIG. 1 wherein one of the forming molds 42 is axially aligned with the receptacle 34.

In the forming of the finished cup C from the body blank B, various successive operations are performed automatically with the apparatus now being described and, subsequent to the punching out of the body blank B and loading of the same into a forming member 42, all of the various cup forming operations are performed with the material of the body blank B confined within its respective forming mold 42 as it is carried by the table 41 arcuately and intermittently throughout various indexed positions of the table 41, which positions will be referred to hereinafter as stations I through X, respectively. The table 41 is rotated clockwise as viewed from above by counterclockwise rotation of the drive cam 51 and the position at which a forming mold 42 is located for receiving a body blank from the receptacle 34 will hereinafter be referred to as station I with each successive position of the remaining forming molds 42 being designated as stations II, III, IV, V, VI, VII, VIII, IX and X, respectively, in a clockwise direction as indicated more clearly in FIGS. 2, 3 and 4. It should be understood, however, that during continuous operation of the table 41, each forming mold 42 which is initially axially aligned with the receptacle 34 will be intermittently continuously moved clockwise to each of the successive stations in the order given and return to become again axially aligned with the receptacle 34 and receive another body blank B to be processed.

In brief outline, the sequence of cup forming operations which are performed at the stations I through X is as follows:

At station I, the prefolded body blanks B are transferred from the preforming receptacle 34 into the female forming molds 42, wherein the opposite side edges of the body blanks are brought into abutting or overlapping relation with each other, as the case may be, depending on the precontrolled relative sizes of the body blanks and forming molds 43. The finished cup C may be seamed along its side either by abutting or overlapping the edges of the body blanks B as will become readily apparent from the description to follow.

In passing on to station II (see FIG. 8) the tab parts 24 of the blanks B are folded inwardly toward each other and a tapered male forming member 65 is simultaneously lowered into the space between the encircling inner side wall of the blanks B while at the same time a plunger 66 is raised against the bottom open end of the female forming molds 42 to close off the forming molds and along with the male forming member 65, confine the material of the body blank B within the forming molds. Upon reaching station II (see FIG. 10), the male forming members 65 are forced snuggly into the female forming molds to force the material of the blanks B tightly against the side walls thereof and against the plungers 66 to form the material of the blanks B to substantially the shape desired of the finished cup. Immediately upon leaving station II, the male forming members 65 are lifted slightly while holding the body blanks in their preformed conditions. The slight lifting of the male forming members provides expansion space at the bottom and around the side walls thereof to allow the material of the body blanks B to be subsequently expanded and fill said space.

At stations III, IV and V (see FIGS. 5 and 11), heat is applied to the body blanks B to expand the material thereof and render the same thermoplastic whereupon the adjoining parts or adjacent edges of the body blanks will fuse together as results from the intermingling of the material at said edges and the expansion of the material of the blanks which enlarges its cellular structure.

At stations VI, VII, VIII and IX (see FIG. 6), the expanded and fused material of the body blanks is cooled to cause the same to become self-supporting and permanently retain its expanded and integral molded shape. Upon leaving station IX the male forming members 65 are retracted and a slight upward push is applied to the bottom of the cups by raising the plungers 66 slightly to loosen the cups in the female forming molds 42 and at station X (see FIG. 12), an ejecting pin is raised in the plungers 66 to raise the finished cups C upwardly out of the female forming molds and into a receiving chute for packaging. Passing from the station X back to station I, the above process is repeated.

Referring now to station I in more detail, there is provided within the receptacle 34, a vertically slidable spider 67 having finger portions 68 adapted to engage the upper edge part of a body blank B when said blank is pushed into the receptacle as described above. The spider 67 is movable vertically in the receptacle 34 and is actuated by an air cylinder or the like 69 which acts to raise the spider 67 to the top of the receptacle 34 during the pushing of a body blank B into the receptacle 34. When a female forming member 42 is registered with the receptacle 34, the air cylinder is actuated to cause the spider to move down in the receptacle 34 and engage the upper edge of the blank B with its finger portions 68 thereby forcing the blank B outwardly through the bottom of the receptacle 34 and into the forming mold 42 which is axially aligned therewith.

Upon entering the female forming mold 42 the main body portion 23 of the blank B will be curled to cause its opposite edges to meet or slightly overlap each other depending upon the relative sizes of the blank and cavity of the mold 42, as pointed out hereinabove. At the same time, the tab parts 24 of the blank B will extend through the forming mold 42 and be forced inwardly towards each other to bend along the scored line 26 by striking the V-shaped recess 70 in a stationary folding plate 71 which is mounted on brackets 72 fixed to the base 40 of the apparatus. The forming plate is positioned with its upper surface having the recess 70 therein in close adjacent relation to the underside of the table 41. The recess 70 tapers or is inclined gradually upwardly from its deepest end which is in axial alignment with the receptacle 34 towards station II (see FIG. 9) and at a location adjacent station II, the recess 70 diminishes and blends into the flat upper surface of plate 71. Rotation of the table 41 from station I to station II will cause the tab parts 24 to follow along the recess 70 and be forced to fold gradually upwardly to the point when they are nearly parallel to the undersurface of the table 41.

The folding plate 71 is terminated near the location of station II at which point the above-mentioned plungers 66 move up into engaging relation with the tab parts 24 and continue to force the tab parts upwardly into the cavity of the forming mold 42 while at the same time, the upper surface of the plungers will close off the open bottom of the female forming mold.

It will be noted more particularly in FIGS. 10 and 11 that the upper surfaces of the plungers 66 are shaped in accordance with the shape desired of the bottom section of the finished cup C so that at stations III, IV and V wherein the material of the body blank B is heated and rendered thermoplastic, said material will flow over the upper surfaces of the plungers 66 and thereby assume the particular shape thereof to produce a desired shape to the bottom of the cup C.

The plungers 66 are carried by a disclike support 73 which is securely attached to the vertical shaft 44 at a location beneath the table 41. Each plunger 66 embodies a reduced elongated depending shank part 74 which is slidably fitted in a vertically extending opening 75 in the disclike support 73 adjacent the outer peripheral edge of the support 73. The openings 75 are each axially aligned with a respective one of the female forming molds 42 in the table 41 so as to cause the plungers 66 to be likewise axially aligned with said female forming molds at all times. An enlarged shoe part 76 is provided at the lower terminal end of each of the shank parts 74 which rides over the upper surface 77 of an annular stationary cam member 78 which is secured to the base 40 of the apparatus. The disclike support 73 rotates in unison with the table 41 and thus in carrying the plungers 66 causes the shoe parts 76 thereof to ride over the surface 77 of the cam 78 which raises and lowers the plungers 66 in timed sequence with the various cup forming operations briefly discussed above. Spring members 79 under compression between the undersurface of the disclike support 73 and the respective shoe parts of the plungers 66 cause the shoe parts 76 to maintain a firm engaging relation with the cam 78 at all times.

It will be noted in FIG. 1 that the plungers 66 are lowered below the folding plate 71 while passing by station I and are lifted by a rise 80 in the cam surface 77 to close off the lower open end of their respective female forming molds 42, as described above, just prior to reaching the location of station II. It is pointed out that the plungers 66 are retained in this raised position by the flat portion of the cam surface 77 throughout the cup forming operations which are performed at stations II through IX.

While a plunger 66 is being raised between stations I and II by the indexing or rotation of the table 41, a male forming member 65 is simultaneously lowered into the female forming mold to force the material of the body blank B against the side walls of the female forming mold and also against the upper end surface of the plunger 66 as shown more particularly in FIG. 10.

The male forming members 65 are identical and one is provided to mate with each of the forming molds 42. Each male forming member 65 embodies a frusto-conical terminal end portion 81 of a shape complementary to that of the cavity of the female forming molds 42 but of a size smaller than the cavities of the molds 42 by an amount substantially equal to the thickness of the material of the body blanks B so that when positioned as shown in FIG. 10, the male forming member will press both the side wall and bottom parts of the blank B firmly against the respective forming mold 42 and plunger 66. Adjoining the conical portion 81 is a cylindrical section 82 to which is attached an elongated axially aligned supporting shaft 83. The shaft 83, cylindrical section 82 and conical portion 81 may be formed as an integral unit for certain applications of use or one or more of the above-mentioned parts may be formed separately and rigidly connected with the remaining parts as in the case illustrated more specifically in FIG. 11 wherein the conical portion 81 is separable from the cylindrical section 82.

In view of the fact that the apparatus shown in FIGS. 1 through 12 is designed more specifically to employ the use of steam as means to heat the body blanks B at stations III, IV and V, the conical portions 81 of the male forming members 65 are constructed of a permeable ceramic material or the like with a hollow interior 84 and an externally threaded upper end part which is threaded into a mating internally threaded cavity 85 in the lower end of the cylindrical section 82. A flexible steam line 86 is connected to each of the cylindrical sections 82 by suitable couplings 87 and through passageways 88 and 89, the steam from the line 86 is directed into the internal cavity 84 wherein it will permeate through the conical portion 81 to the material of the body blank B. At this point it is also pointed out that the female forming molds 42 are also formed of a permeable material similar to that of the conical portions 81 in the arrangements shown in FIGS. 1–12 so as to permit the steam to completely penetrate the material of the body blanks B. It should be understood, however, that various other materials or types of construction may be used in the fabrication of the male forming members 65 and the female forming molds 42 as will be described hereinafter in relation to the various illustrated modifications of the invention.

The male forming members 65 are suspended, each in axial alignment with a respective female forming mold 42, through appropriate axially aligned openings 90 radially disposed adjacent the outer peripheral edge of a carrying disc 91. The disc 91 is rotatable with the table 41 and supported thereabove by a pillar or the like 92 which is bolted or otherwise secured to the upper surface of said table 41.

The shafts 83 of the mold forming members are intimately slidably fitted through the openings 90 and their uppermost ends are each provided with rollers 93 and 94 which are fitted in the raceway 95 of a stationary circular cam track 96. The cam track 96 is bolted or otherwise secured to the underside of a fixed overhanging head part 97 of the machine which is an integral part of a rigid vertical support attached to or integrally formed as a part of one side of the base 40.

In order to accurately support the complete rotating structure thus far described without producing an excessive lateral thrust on the shaft 44 journallings, a stub shaft 98 is placed in axial alignment with the shaft 44 and bolted or otherwise secured to the upper surface of the disc 91 and the stub shaft 98 is journalled in bearings or the like 99 in the head 97.

The raceway 95 in the cam track 96 is T-shaped and each of the shafts 83 are of a diameter such as to loosely pass through the downwardly and outwardly opening section 100 of the raceway 95. The rollers 93 are held in constant engagement with the sections of the raceway adjacent said opening 100 by a third roller 94 which rides against the top surface of the raceway. In this manner, substantially no vertical play is existent in the shafts 83 while traveling around the cam track 96 and at the same time they are easily driven, by rotation of the disc 91, around the annular path of the raceway 95.

The track 96 is raised and/or lowered at various locations about its circumference to thereby cause a raising or lowering of the male forming members 65 at or between certain of the stations I through X. In this respect it can be seen from FIGS. 1 and 4 that the cam track 96 is raised where it passes over station I to cause the forming members 65 to clear the blank loading receptacle 34 and thus not interfere with the loading of the body blanks B at station I. Between station I and II, however, the track 96 cams downwardly to cause the forming members 65 to be lowered into their respective axially aligned female forming molds 42 and at the location of station II the forming members 65 are fully lowered to assume the position shown in FIG. 10 and perform the function described above with relation to FIG. 10.

It will be noted more particularly in FIGS. 1, 10 and 11 that, on the cylindrical section 82 of the male forming members, there is provided a fixed collar 101 having suspended therefrom by guide pins 102, an axially movable relatively close fitting collar 103. The pins 102 having enlarged head parts 104 pass through guide openings 105 in the fixed collar 101 and are threadedly or otherwise secured to the axially movable collar 103. Spring members 106 are placed under compression in surrounding relation with each of the pins 102 between the collars 101 and 103 so as to normally urge the movable collar 103 axially downwardly away from collar 101. With the male forming members 65 raised or out of engagement with the female forming molds, the springs 106 will force the collar 103 away from collar 101 a predetermined distance in accordance with the lengths of the pins 102 wherein the enlarged head parts 104 thereof will act as stops to hold the collar 103 in a position of use on the forming member 65.

When the male forming members 65 are lowered into the female forming molds 42 while traveling between stations I and II, the collars 103 will engage the upper surface of the table 41 before the conical portions 81 are fully inserted into the mold members 42. Continued downward movement of the members 65 will compress the springs 106 (see FIG. 10) and cause the collars 103 to firmly seat against the upper surface of the table 41 and the flush upper ends of the forming molds 41 thereby completely closing off the normally open upper ends of the forming molds 41, while simultaneously engaging the upper edge of the body blanks B to force the same downwardly.

When the forming of the body blanks B is completed at station II as outlined hereinabove and shown in FIG. 10, indexing of the table 41 to station III will cause the male forming members 65 to be retracted slightly from their respective female forming molds. The raising of the forming members 65 is caused by a slight rise in the cam track 96. By so retracting the male forming members to approximately the position shown in FIG. 11, space is provided around the side and bottom parts of the body blanks B to allow the blanks to expand when heated at stations III, IV and V. It is pointed out that even though the members 65 are retracted slightly, the collars 103 thereof will still securely close off the upper end of the female mold members 42.

With the male forming members 65 and the plungers 66 held in the positions shown in FIG. 11, the table is indexed through stations III, IV and V wherein steam is fed through the lines 86 into the conical portions 81 of the male forming members. As mentioned above, the steam will permeate through the walls of the portions 81 heating the same, while passing into the material of the body blanks B. The combination of the latent heat of fusion of the steam itself and the heat by conduction from the mold sections will render the material of the body blanks B thermoplastic wherein the adjacent or adjoining edges of the side wall and the various tablike parts 24 thereof will expand and fuse together along with a simultaneous inherent blowing up or expansion of the material in general to form said material into an integral mass filling out the confines of the spacing between the female forming molds 42 and the male forming members 65 and plungers 66. It is pointed out that all steam which completely penetrates the material of the body blanks B will exhaust into water jackets 108 (not being used at this time) which surround the female forming molds 42 and/or through the exposed bottom edges of the permeable material of the molds 42.

Figure 5:
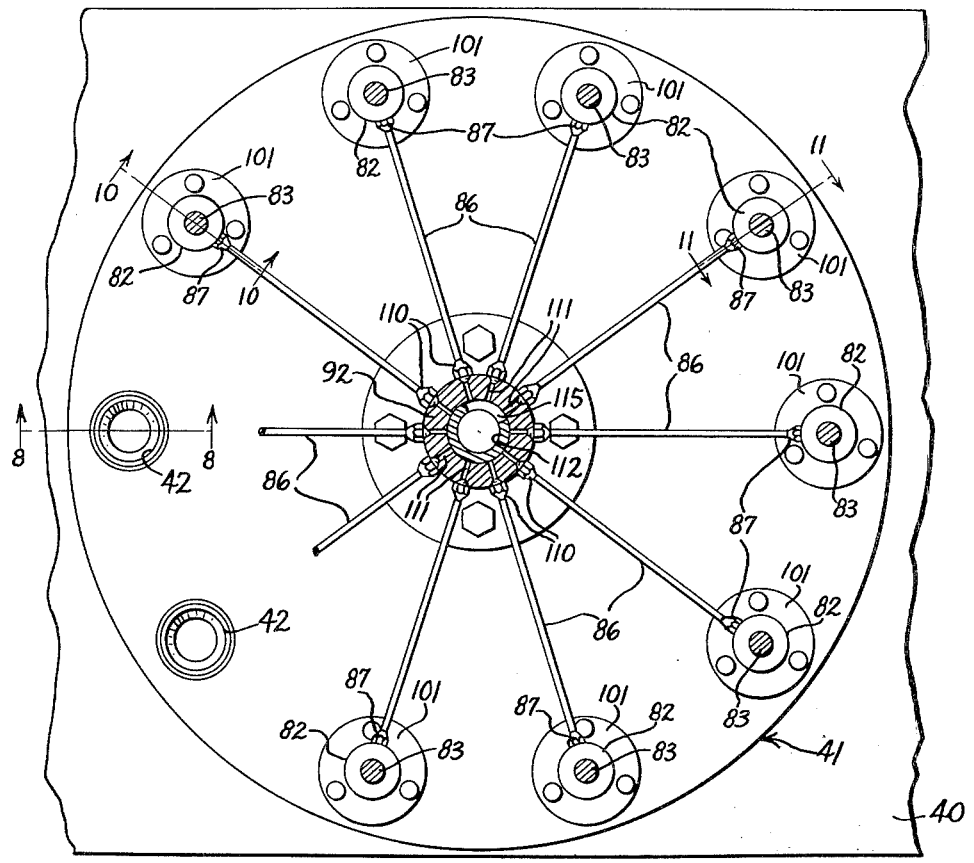
FIG. 5 is a horizontal cross-sectional view taken substantially along line 5—5 of FIG. 1 looking in the direction of the arrows.

In referring more particularly to FIGS. 1 and 5, it can be seen that means is provided for supplying steam to the steam lines 86 of the male forming members 65 only at the time the said members are located at or between stations III, IV and V. At all other positions of the table 41, no steam is permitted to pass through the lines 86. In accomplishing this feature of the apparatus, an axial opening 109 is provided through stub shaft 98, disc 91 and part way through the pillar 92 to a point where each of the flexible steam lines 86 are coupled at 110 to the pillar 92. Individual communicating channels 111 (see FIG. 5) are provided between the opening 109 and each of the lines 86 and a circular hollow bland-like fitting 112 is seated at the base of the opening 109. The fitting 112 is connected to a vertically extending steam line 113 which extends outwardly of the opening 109 to a source of supply (not shown).

The steam line 113 is rigidly clamped by a bracket 114 to the stationary head 97 so as to be prevented from rotating and thereby prevent its attached fitting 112 from rotating while at the same time permitting the table 41 and pillar 92 carrying the steam lines to rotate freely about the fitting 112. A side opening 115 is provided in the fitting 112 which faces stations III, IV and V and is of a width such as to permit steam to exit from the fitting 112 through three steam lines 86 simultaneously only when they are registered with the opening 115.

After passing station V, steam will obviously no longer be permitted to pass through the lines 86 and for the period of time required to index the table 41 through the next four stations (VI, VII, VIII and IX) cold water is circulated through the water jackets 108 to cool and thereby harden the material of the body blanks B which has now been expanded and fused into the final shape of the cups C.

Referring now more particularly to FIGS. 1 and 6 wherein the water circulating system is best illustrated, it can be seen that an axial opening 116 is provided through the shaft 44 which communicates with another central opening 117 in the table 41 in which a pair of superimposed hollow gland-type fittings 118 and 119 are intimately fitted. The fittings 118 and 119 each have side openings 120 (see FIG. 4) in superimposed relation with each other and facing the stations VI, VII, VIII, and IX.

In the table 41 there is further provided radial channels 121 and 122 which interconnect with each of the water jackets 108 and with the opening 117. The channels 121 are at a level such as to communicate with the fitting 118 when indexed into alignment with its side opening 120 while channels 122 are at a lower level such as to similarly communicate with the side opening in the fitting 119. It is pointed out that the side openings 120 in the fittings 118 and 119 are controlled in width to permit only four of the channels 121 or 122 to be registered therewith at the same time so that water passing through said fittings will only circulate through the jackets 108 of the mold members 42 which are indexed to and located at or in between stations VI, VII, VIII and IX.

A tubular supporting shell 123 is rigidly connected to the fittings 118 and 119 and extends downwardly through the base 40 where it is rigidly clamped by screws or the like 124 to hold the shell 123 and fittings 118 and 119 stationary while permitting rotation of the shaft 44 and table 41 about the same. Water lines 125 and 126 are passed through the shell 123 each to a respective fitting 118 and 119 and by directing water under controlled pressure into line 125 it will pass into the fitting 118 outwardly through its side opening 120, through the channels 121 (which are registered therewith) and into the respective adjoining water jackets 108 whereupon it will circulate back through channels 122 and into the fitting 119 to be returned through the line 126.

From the above it can be seen that a circulating water cooling system is provided which comes into operation only when the forming molds 42 are indexed to or in between stations VI, VII, VIII and IX.

Figure 12:
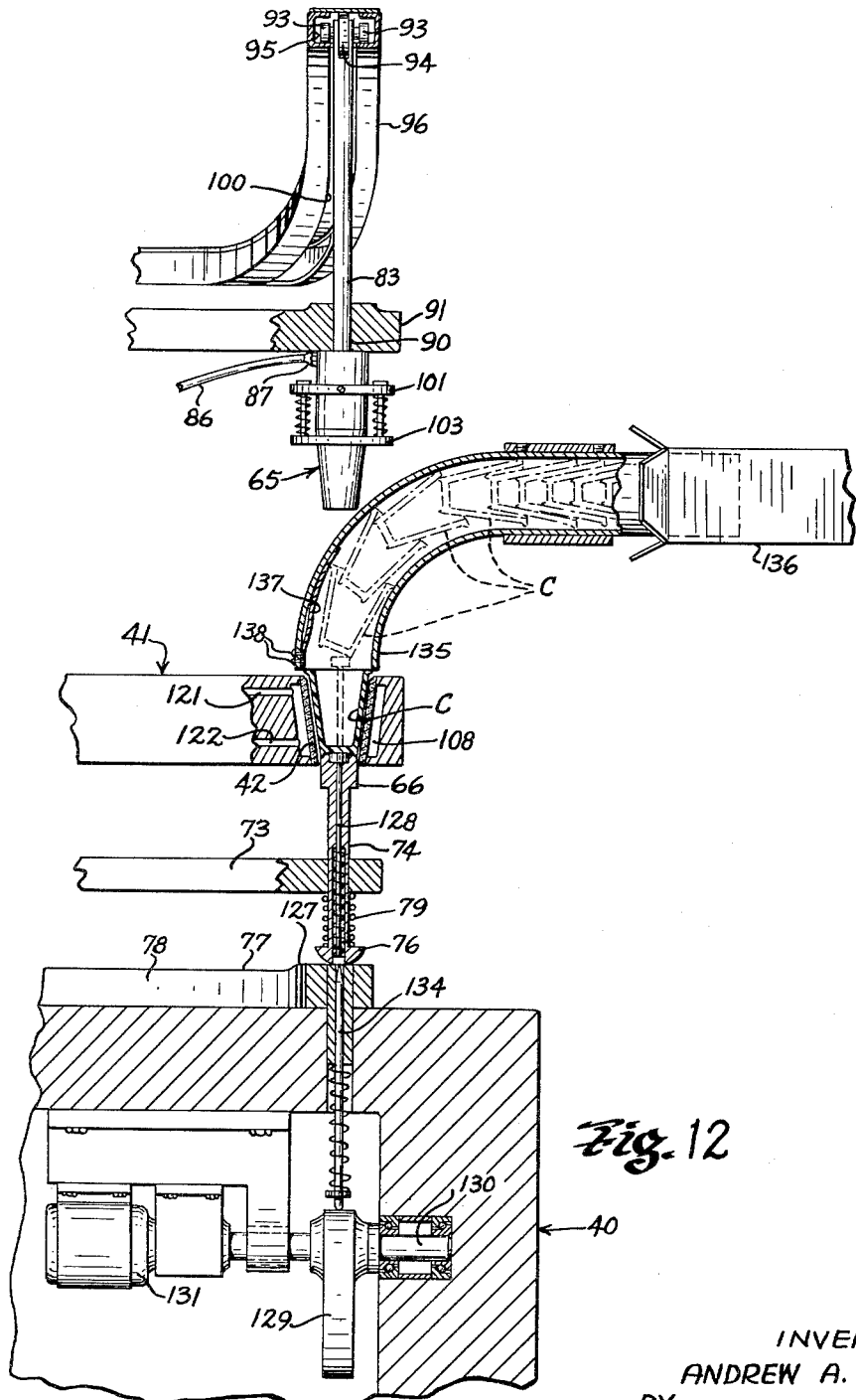
FIG. 12 is a fragmentary vertical cross-sectional view taken substantially along line 12—12 of FIG. 4 looking in the direction of the arrows.

After passing station IX, the cup C is completely cooled to the point where the material thereof has hardened and becomes self-supporting and at station X the cup is ejected from the apparatus as follows:

Upon leaving station IX the cam track 96 raises to approximately the highest point shown in FIG. 1 wherein the mold forming members 65 are caused to lift and be automatically completely retracted from the female forming molds 42 as shown in FIG. 12. At the same time, immediately before reaching station X a slight rise is provided in the cam surface 77 of the fixed cam 78 upon which the shoe parts 76 of the plungers 66 ride. Upon passing over this rise 127, the plungers 66 are forced slightly upwardly into the female forming molds 42 thereby pushing the cups C upwardly to loosen them in the molds 42 and thereby avoid any possible difficulties due to sticking in the molds which might hinder their subsequent ejection.

Upon arriving at station X the cups C are ejected from the mold members 42 by an ejection pin 128 which extends vertically completely through each of the plungers 66 (see FIG. 12). Actuation of the ejection pin 128 is brought about by a rotatable cam 129 which is keyed to a shaft 130 journalled in the base 40 and driven by a motor 131. The motor 131 is energized by actuation of a micro switch 132 (see FIG. 1A) which is engaged by the indexing cam 51 so that immediately following each indexing of the table 41, the switch button 133 is depressed by the underneath side of the indexing cam 51 for a period of time controlled to cause the motor 131 to rotate the cam 129 360° from the position shown in FIG. 12. In so rotating the cam 129 a spring loaded push rod 134, which extends through the top section of the base 40 and through the stationary cam 78 (see FIG. 12), is forced upwardly and engages the ejecting pin 128 to force the same upwardly against the base of the cups C and push the cups C upwardly into a receiving chute 135. It will be noted that as the cups are successively ejected into the chute 135, each cup will nest with the previously ejected cup and a stack will form in the chute which is intermittently advanced therethrough by the pushing of each successive last ejected cup into the chute. If desired, a packaging carton or the like 136 may be fitted over the end of the chute as shown in FIG. 12 to receive a stack of the nested cups.

When the cam 129 returns to the position illustrated in FIG. 12, after each cup ejecting operation, the push rod 134 will retract and the ejecting pin 128 will drop back into the plunger 66. In order to positively prevent the last ejected cup or any of the previously ejected cups from dropping back in the chute 135, a very thin and flexible leaf spring 137 is pinned or otherwise connected at 138 to the inner side of the chute with its free end extending upwardly. The lower end of the spring 137 is provided with a slight inwardly directed bow or bend 139 to cause the spring to urge the ejected cups gently against the opposite wall of the chute 135 and thereby prevent them from slipping back in the chute. The spring 137, being easily fixed, will offer little resistance to the passing of each ejected cup over the bend 139.

At the completion of the cup ejecting operation at station X, the table is again indexed to return to station I wherein the entire above described process is repeated. In approaching station I a drop 140 (see FIG. 1A) in the cam surface 77 of cam 78 will cause the plungers 66 to lower and be adapted to pass under the above described apparatus relating to station I. At the same time, the male forming members 65 are raised by track 96 to pass over the apparatus of station I.

It should be understood that while the cup forming process was described above in step-by-step fashion by describing the operations which take place at or between the stations I through X, these operations at the various stations are all performed simultaneously, each on a separate cup. For example, at each ejection of a finished cup at station X, a new body blank B is loaded at station I while other cups are at various stages of being finished throughout the intermediate stations.

It is pointed out that the resultant finished cups C which are formed from an initially relatively thin sheetlike blank, embody permanently and integrally fused and leakproof seams at the joinders of the various meeting sections of the blanks as contrasted with the usual glued or folded and pressed seam parts of conventional paper cups. Moreover, the unicellular structure of the material of the cups, particularly when expanded as described above, provides the cups C with unusual heat and/or cold insulating properties.

Figure 13:
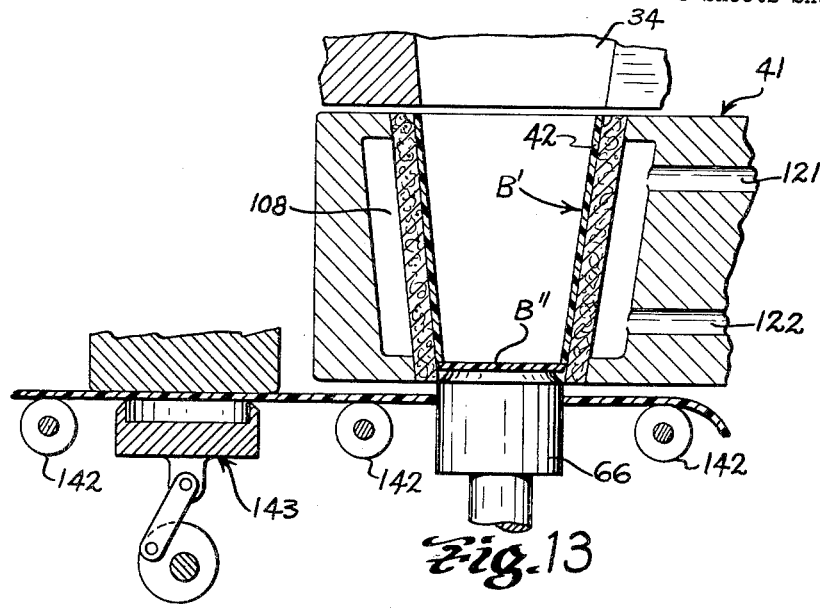
FIG. 13 illustrates a modification of the container forming apparatus of the above-described figures.

While the above described process has dealt with the forming of cups from onepiece blanks B, a twopiece article may be formed with the apparatus of FIGS. 1-12 as shown in FIG. 13 by simply blanking body blanks B' similar to the blanks B but without the tablike parts 24. This will eliminate the need for the scoring die 27 and its associated operating mechanism and the blank B' will be used to form the side wall part of the cups. The folding plate 71 (FIG. 1) is removed and a second web of material 141 is directed horizontally by rollers or the like 142 beneath the table 41 at the loading station I. A circular bottom section B" for the cup is blanked by a clicking die 143 or the like but is retained in the web 141 after blanking by known methods of providing breakaway sections about the line of punching.

When the blanked bottom section B" of the cup becomes registered with the lower open end of the female forming molds 42, the plungers 66 are caused to rise and break the section B" away from the web 141 forcing the same into the female forming molds 42 in abutting relation with the section B'. The plungers 66 are then momentarily retracted to pass under the perforated web when the table 41 is indexed from station I to station II and again raised by cam 78 wherein the subsequent steps of forming the twopiece cup would be performed precisely as described above in relation to the forming of the cup from the onepiece blank B.

Figure 14:
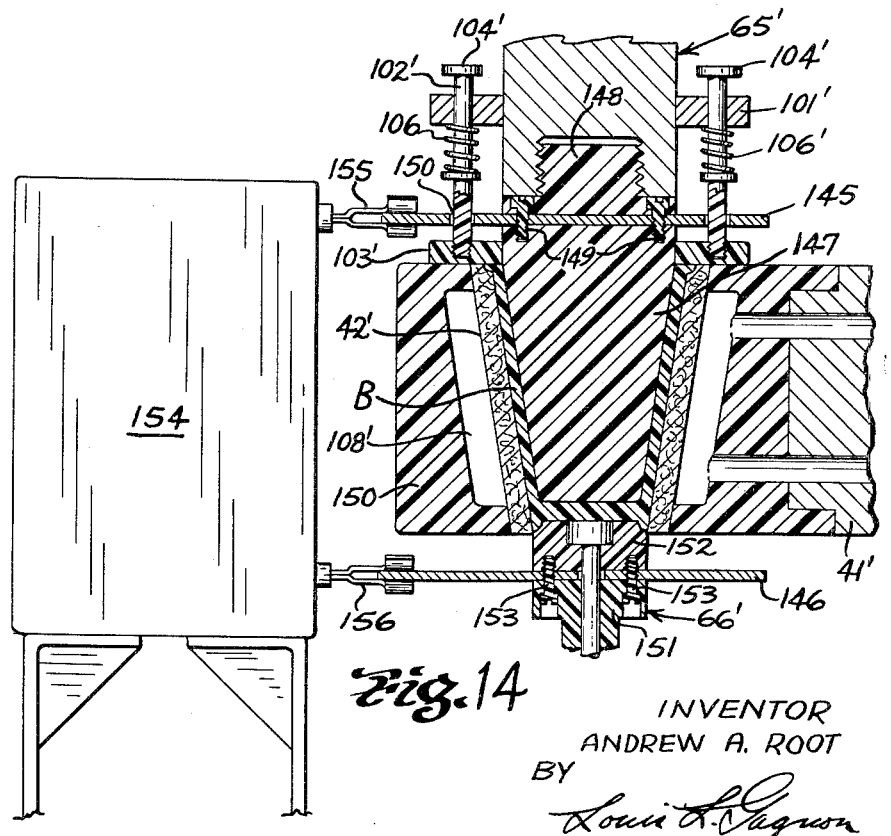
FIG. 14 illustrates a further modification of the above-described apparatus.

In FIG. 14 there is shown a modification of the invention wherein dielectric heating means is provided to electronically heat the material of the cup blanks B or B'. Thus the arrangement of FIG. 14 replaces the steam system shown in FIGS. 1-12 and eliminates the need for the steam inlet 113, fitting 112 and the lines 86.

With the arrangement shown in FIG. 14, however, the male forming members 65, plungers 66, female forming molds 42 and at least the outer peripheral portion of the table 41 must be constructed of a material which is non-responsive to high frequency electrical energy wherein substantially no energy conversion from electrical energy to its equivalent in heat energy will take place within the mass of material which is used to form the abovementioned parts. Many different materials are so characterized and may be used for the construction of the above-mentioned parts, one of which is known commercially as "Teflon" and manufactured by E. I. du Pont de Nemours and Company of Wilmington, Delaware.

Referring more particularly to FIG. 14, it can be seen that a pair of platelike electrical conducting elements or electrodes 145 and 146 are permanently positioned in superimposed relation with each other in each of the respective pairs of male forming members 65' and plungers 66'. In adapting the electrode 145 to the male forming member 65', its lower conical end section is formed of two parts 147 and 148 of non-dielectric material between which the electrode 145 is sandwiched. The parts 147, 148 and the electrode 145 are bolted together with bolts 149 which are also formed of a non-dielectric material and passed through openings in the electrode 145.

The collar 103' and guide pins 102' are formed of a non-dielectric material but are otherwise identical in construction and function to the above-described similar parts 103 and 102. In the present instance, however, springs 106' have been placed above the electrode 145 so as to avoid interference with the same. The pins 102' pass freely through appropriate openings 150 in the electrode 145. The table 41' is similar to table 41 with the exception of its outer peripheral edge section 150 which is, in the present case, formed of a non-dielectric material. It should be understood that the complete table 41' may be formed of the non-dielectric material if desired or the arrangement shown in FIG. 12 may be used, it being only necessary that no dielectric material other than that of the cups to be formed is disposed between the electrodes 145 and 146.

As mentioned above, the female forming mold 42' is formed of the non-dielectric material as is the uppermost part of the plunger 66'. The upper end of the plunger 66' which supports the electrode 146 is formed in two parts 151 and 152 having the electrode 146 sandwiched therebetween and connected together by bolts 153 also formed of the non-dielectric material.

A radio frequency generator 154 is positioned at a fixed location adjacent the outer peripheral edge of the table 41' by being attached to the base of the machine or mounted on the floor as a separate stationary unit. The fixed location would preferably be between stations III, IV and V (see FIG. 4). Extending outwardly from the generator 154 are a pair of contacts 155 and 156 adapted to receive the outer edge parts of the respective electrodes 145 and 146 when the table 41' is rotated to locate the same in registry with the generator 154. The contacts 155 and 156 are of the spring type adapted to accept the edges of their respective electrodes when the electrodes are knifed into the same by rotation of the table 41'.

Upon engaging the contacts 155 and 156, as shown in FIG. 14, high frequency electrical energy is passed between the electrodes 145 and 146, one of which is grounded in a conventional manner through the equipment of the generator 154 and a conversion of the electrical energy to heat energy in the material of the cup blank B takes place instantaneously to render said material thermoplastic and to simultaneously expand and cause the meeting edge of the same to join. Upon being indexed past the generator by rotation of the table 41', the electrodes 145 and 146 disengage from the contacts 155 and 156 and the fused and expanded cup passes through the above-described cooling and ejecting stations VI, VII, VIII, IX and X.

It is pointed out that the electrodes 145 and 146 are carried by the male forming members 65' and the plungers 66' throughout each cup forming operation but are only energized when engaged in the contacts 155 and 156.

It is pointed out that heating techniques other than those described hereinabove may be incorporated in the apparatus and method of the invention such as, for example, heating by conduction wherein electrical heating coils are placed around the female forming molds 42 or 42' in the space of the water jacket 108 or 108'. The heating coils would in such a case be of the submersible type or alternatively individually encased to avoid being contacted by the circulating water or coolant at stations VI, VII, VIII and IX.

While thus far the description has dealt primarily with the forming of drinking cups or the like, it should be understood that various differently shaped articles, such as plates or boxes or egg crates or any carrier with the contour of a specific product to be supported therein may be manufactured by the apparatus and method of the invention by simply redesigning the shape of the male and female forming parts 65 and 42 and the plungers 66. For example, in FIG. 16 there is shown a modification of the invention wherein means adaptable to the above-described apparatus is provided for making boxes or like articles.

Figure 16:
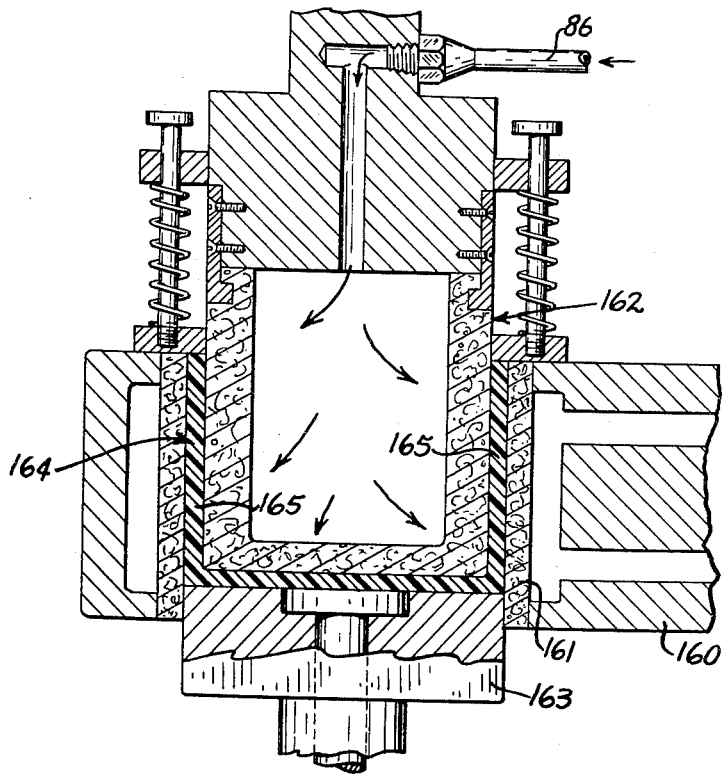
FIG. 16 is a still further modification of the apparatus of FIGS. 1–14 which is incorporated in the manufacture of a container from the body blank shown in FIG. 15.

In making a boxlike structure, the table 41 is redesigned slightly, as shown by 160 in FIG. 16, wherein open-ended rectangularly shaped female forming molds 161 replace the conical forming molds 42 and the previously described male forming members 65 are replaced by rectangularly shaped members 162. In a similar fashion rectangular shaped plungers 163 are provided to replace the cylindrical plungers 66 of the apparatus shown in FIGS. 1–12.

Figure 15:
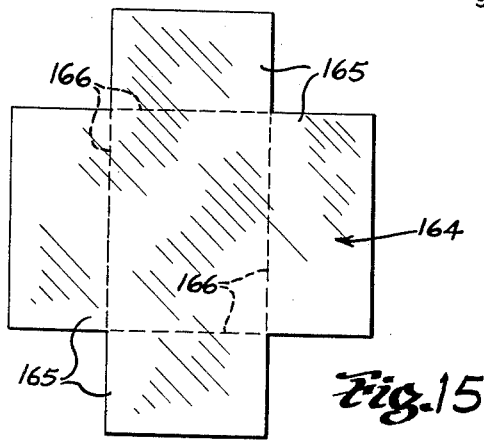
FIG. 15 is a plan view of one form of body blank used to form containers of the invention.

A body blank 164 (see FIG. 15) formed from an extruded web similar to web 21 of FIG. 1 is forced into the female mold member 161 causing its side tabs 165 to fold upwardly substantially along the dash lines 166. The blanking of the body blank 164 is accomplished with a clicking die arrangement or the like, such as shown in FIG. 13, which replaces the blank forming and loading section of the apparatus of FIG. 1. In the present instance, however, the clicking die arrangement is inverted from the position illustrated in FIG. 13 and located so as to have the web pass over the top of the table 160 wherein the lowering of the forming member 162 will engage a blank 164 and force the same downwardly into the mold member 161 much in the same manner as the plunger 66 of FIG. 13 forces the blank B″ upwardly into the mold member 42.

The lower end section of the male forming member 162 is of an outer contour size sufficiently smaller than the size of the cavity of the mold 161 to space the respective adjacent walls thereof a distance apart equal to that desired of the finally expanded and fused structure of the box to be formed from the blank 164. After the loading of the blank 164 at station I (see FIG. 4) the sequence of operations which heat, cool and eject the finished product are performed exactly as described above with reference to the cups C. It is pointed out that the arrangement shown in FIG. 16 is adapted to steam heat the blank 164 in a manner such as described with relation to FIGS. 1, 5 and 11. However, dielectric heating may be employed by modification of the apparatus of FIG. 16 in similar fashion to the apparatus shown in FIG. 14.

It should be clear that the method and apparatus of the invention is not limited to the manufacture of any one specific item but may be readily adapted to the manufacture of various different articles and designs thereof as previously mentioned herein. It should also be understood that reinforcing ribs or raised designs or the like may be formed as an integral part of the manufactured articles by simple conventional modification of the wall parts of the mold members described above to provide them with means for simultaneously forming said ribs or designs.

From the foregoing, it will be seen that simple, efficient and economical means and method have been provided for accomplishing all the objects and advantages of the invention. Nevertheless, it should be apparent that many changes in the details of construction, arrangement of parts and steps of the method may be made without departing from the spirit of the invention as expressed in the accompanying claims. The invention, therefore, is not to be limited to the exact matters shown and described as only the preferred constructions and methods have been given by way of illustration.

Having described my invention, I claim:

1. Apparatus for making from initially relatively thin heat-expandable and fusible thermoplastic sheet material a molded fused container having wall portions thicker than said initially thin sheet material, comprising means for forming a container blank from said initially relatively thin sheet material, said blank having a body portion contoured to a predetermined shape and size such as to ultimately provide a first wall portion of said container and tab-like portions extending laterally from said body portion of such predetermined shapes and sizes as to cooperatively provide a second adjoining wall portion of said container when said container blank is folded to position respective edges of said body portion and tab-like portions in adjacent relation with each other, an open-ended female mold member having an inner surface shape and size corresponding to the outer surface shape and size desired of said container, means for positioning said container blank in said female mold member through a first open end thereof, a male mold member having an outer contour shape and size substantially corresponding to the inner contour shape and size desired of said container, said male mold member being disposed in substantially coaxial relation with said female mold member adjacent said first open end thereof, means for causing said male mold member to enter substantially coaxially into said female mold member through said first open end and subsequent to the reception of said container blank in said female mold member and in such manner as to position a portion of said container blank relatively tightly between inner and outer sides respectively of said female and male mold members and to bring certain edges of said container blank into adjacent relation with each other, a first closure member for closing said first open end of said female mold member, a second closure member functioning cooperatively with said male mold member to close the opposite end of said female mold member and to engage and simultaneously position at least one other portion of said container blank relatively tightly against said male mold member, means for retracting said male mold member sufficiently in a direction outwardly of said female mold member to space the outer sides of said male mold member from the inner side of said female mold member and from said second closure member a controlled amount greater than the thickness of said sheet material in accordance with the final thicknesses desired of the wall parts of said container in excess of the initial thickness of said sheet material, said retracting of said male mold member being accomplished while retaining said closure members in closed relation with their respective open ends of the female mold member, means for applying heat to said container blank while confined in said spacing between said mold members of a temperature and for such duration as to cause the material of said container blank to expand to the limit controlled by said spacing of said male and female mold members and to simultaneously cause the material of said container blank to intermingle and fuse at said adjacent edges thereof to complete said molded fused container.

2. Apparatus for making from initially relatively thin heat-expandable and fusible thermoplastic sheet material molded fused containers having wall portions thicker than said initially thin sheet material comprising means for forming container blanks from said initially relatively thin sheet material, each blank having a body portion contoured to a predetermined shape and size such as to ultimately provide a first wall portion of a respective container and tab-like portions extending laterally from said body portion of such predetermined shapes and sizes as to cooperatively provide a second adjoining wall portion of said container when said blank is folded to position respective edges of said body portion and tab-like portions in adjacent relation with each other, prefolding means arranged to receive and fold said body portion of each of said container blanks to the general configuration of said first wall portion of a container to be formed therefrom and means for positioning said container blanks successively in said prefolding means, a plurality of open-ended female mold members each having an inner surface shape and size corresponding to the outer surface shape and size desired of said containers, means for successively registering a first open end of each of said female mold members with said prefolding means to receive a prefolded container blank therefrom, means for moving a prefolded container blank from said prefolding means into each of said female mold members, a plurality of male mold members each having an outer contour shape and size substantially corresponding to the inner contour shape and size desired of said containers, said male mold members each being disposed in substantially coaxial relation with a respective one of said female mold members, means for causing said male mold members to enter the adjacent open ends of respective female mold members subsequent to the reception of said prefolded container blanks in respective female mold members and in such manner as to position said body portion of said prefolded container blanks relatively tightly between inner and outer sides respectively of said female and male mold members with respective edges of said body portions of said blanks in adjacent relation with each other, means for closing said open ends of said female mold members through which said male mold members enter, means functioning cooperatively with said male mold members to close the opposite end of each of said female mold members and to engage and simultaneously fold said tab-like portions of respective container blanks into adjacent relation with each other and relatively tightly against said male mold members, means functioning subsequent to said folding of said tab-like parts for retracting each of said male mold members sufficiently in a direction outwardly of their respective female mold members to space said outer sides of said male mold members from said inner sides of respective female mold members a controlled amount greater than the thickness of said sheet material in accordance with the final expanded thicknesses desired of the wall parts of said containers in excess of the initial thickness of said sheet material, said retracting of said male mold members being accomplished while retaining said closure means in closed relation with respective ends of said female mold members, a side of at least one of said mold members of each related pair thereof being of a permeable nature, means for directing a heating medium through respective permeable sides of said mold members onto said container blanks therein and said heating medium being of a temperature and for such a duration as to cause the material of said container blanks to expand to the limit controlled by said spacing between respective male and female mold members and to simultaneously cause the material of each container blank to intermingle and fuse along adjacent edges thereof to complete said molded fused containers.

3. Apparatus for making from initially relatively thin heat-expandable and fusible thermoplastic sheet material molded fused containers having wall portions thicker than said initially thin sheet material comprising a base, a cutting die and punch member supported on said base, means for directing a continuous sheet of said relatively thin thermoplastic material between said cutting die and punch member, means for actuating said punch member intermittently to function cooperatively with said die member and successively form container blanks from said sheet material, said cutting die and punch member being so constructed and arranged as to provide each container blank with a body portion contoured to a predetermined shape and size such as to ultimately provide a first wall portion of a respective container and tab-like portions extending laterally from said body portion of such predetermined shapes as to cooperatively provide a second adjoining wall portion of said container when said blank is folded to position respective edges of said body and tab-like portions in adjoining relation with each other, prefolding means on said base arranged to receive said container blanks from said cutting die and fold the body portion of each respective container blank to the general configuration of said first wall portion of a container to be formed therefrom, means for moving said container blanks successively from said cutting die into said prefolding means subsequent to each container blank forming operation of said cutting die and punch member, a rotatable table on said base having a plurality of open-ended female mold members therein each embodying an inner surface shape and size corresponding to the outer surface shape and size desired of said containers, means for rotating said table and successively registering a first open end of each of said female mold members with said prefolding means to receive a prefolded container blank therefrom, means functioning intermittently for moving a prefolded container blank from said prefolding means into each of said female mold members when said female mold members assume registry with said prefolding means, a plurality of male mold members each having an outer contour shape and size substantially corresponding to the inner contour shape and size desired of said containers, means for supporting said male mold members each in substantially coaxial relation with a respective one of said female mold members at all times during rotation of said table, means for causing said male mold members to successively enter adjacent open ends of respective female mold members subsequent to the reception of said prefolded container blanks in respective female mold members and in such manner as to position said body portion of said prefolded container blanks relatively tightly between inner and outer sides respectively of each related pair of said female and male mold members, first closure means for closing said open end of each of said female mold members upon reception of a male mold member therein, second closure means rotatable with said table and male mold members functioning cooperatively with said male mold members to successively close the opposite end of each of said female mold members and to engage and simultaneously fold said tab-like portions of respective container blanks into adjacent relation with each other and relatively tightly against said male mold members, means on said supporting means for said male mold members adapted to function subsequent to said folding of said tab-like parts to retract each of said male mold members sufficiently in a direction outwardly of their respective female mold members to space said outer sides of said male mold members from said inner sides of respective female mold members amounts respectively greater than the thickness of said sheet material, in accordance with the final expanded thicknesses desired of the wall parts of said containers in excess of the initial thickness of said sheet material, said retracting of said male mold members being accomplished while retaining said closure means in closed relation with respective ends of said female mold members, a side of at least one of said mold members of each related pair thereof being of a permeable nature, means for directing a heating medium through respective permeable sides of said mold members onto said container blanks therein to cause the material of said container blanks to expand to the limit controlled by said spacing between respective male and female mold members and to simultaneously cause the material of each container blank to intermingle and fuse along adjacent edges thereof to complete said molded and fused containers.

4. The method of making from relatively thin heat-expandable and fusible thermoplastic sheet material a molded fused container having wall portions thicker than said initially thin sheet material, comprising forming a container blank from said initially relatively thin sheet material having a body portion contoured to a predetermined shape and size such as to ultimately provide a first wall portion of said container and tab-like portions extending laterally from said body portion of such predetermined shapes and sizes as to cooperatively provide a second adjoining wall portion of said container when said container blank is folded to position respective edges of said body portion and tab-like portions in adjacent relation with each other, positioning said container blank in a female mold member having an inner surface shape and size corresponding to the outer surface shape and size desired of said container, placing a male mold member having an outer contour shape and size substantially corresponding to the inner contour shape and size desired of said container internally of said female mold member with said container blank relatively tightly interposed between respective inner and outer surfaces of said male and female mold members and with respective edges of said body and tab-like portions of said container blank being folded into adjacent relation with each other, closing opposite ends of said female mold member, retracting said male mold member sufficiently in a direction outwardly of said female mold member to space the respective adjacent sides of said mold members a controlled amount greater than the thickness of said sheet material in accordance with the final expanded thicknesses desired of the wall parts of said container in excess of the initial thickness of said sheet material, said retracting of said male mold member being accomplished while maintaining said opposite ends of said female mold member closed, applying heat to said container blank in said mold members of a temperature and for such a duration as to cause the material of said container blank to expand to the limit controlled by said spacing of said male and female mold members and to simultaneously cause the material of said container blank to intermingle and fuse at said adjacent edges thereof to complete said molded fused container.

5. The method of making from relatively thin heat-expandable and fusible thermoplastic sheet material molded fused containers having wall portions thicker than said initially thin sheet material, comprising forming container blanks from said initially relatively thin sheet material each having a body portion contoured to a predetermined shape and size such as to ultimately provide a first wall portion of a respective container and tab-like portions extending laterally from said body portion of such predetermined shapes and sizes as to cooperatively produce a second adjoining wall portion of said container when said blank is folded to position respective edges of said body portion and tab-like portions thereof in adjacent relation with each other, prefolding said body portion of each of said container blanks to the general configuration of said first wall portion of a container to be formed therefrom, positioning each prefolded container blank in an open-ended female mold member having an inner surface shape and size corresponding to the outer surface shape and size desired of said containers, placing a male mold member having an outer contour shape and size substantially corresponding to the inner contour shape and size desired of said containers internally of each respective female mold member with said body portion of each prefolded container blank disposed relatively tightly between inner and outer sides respectively of each related pair of female and male mold members and with respective edges of said body portions in adjacent relation with each other, folding said tab-like portions of respective container blanks into adjacent relation with each other and into relatively tightly fitted relation against their respective male mold members, and closing opposite ends of each of said female mold members, retracting each of said male mold members in a direction outwardly of their respective female mold members sufficiently to space said outer sides of said male mold members from said inner sides of respective female mold members a controlled amount greater than the thickness of said sheet material in accordance with the final expanded thicknesses desired of the wall parts of said containers in excess of the initial thickness of said sheet material, said retracting of said male mold members being accomplished while retaining said opposite ends of said female mold members closed, heating said container blanks while in said mold members to a temperature and for a duration such as to cause the material thereof to expand to the limit controlled by said spacing of said male and female mold members and to simultaneously cause said material to intermingle and fuse at said adjacent edges thereof to complete said molded fused containers.

References Cited in the file of this patent

UNITED STATES PATENTS

| | | |
|---|---|---|
| 647,993 | Schmidt | Apr. 24, 1900 |
| 1,842,587 | Davidson | Jan. 26, 1932 |
| 1,853,515 | Egerer | Apr. 12, 1932 |
| 2,337,581 | Wiley | Dec. 28, 1943 |
| 2,343,330 | Sawyer | Mar. 7, 1944 |
| 2,415,370 | Pityo | Feb. 4, 1947 |
| 2,437,884 | Maynard | Mar. 16, 1948 |
| 2,579,399 | Ruekberg | Dec. 18, 1951 |
| 2,780,401 | Stevens | Feb. 5, 1957 |
| 2,831,623 | Lavigne | Apr. 22, 1958 |
| 2,903,747 | Wucher | Sept. 15, 1959 |
| 2,942,301 | Price et al. | June 28, 1960 |
| 2,954,799 | Roggi et al. | Dec. 20, 1960 |
| 2,979,775 | White | Apr. 18, 1961 |

OTHER REFERENCES

The Koppers Booklet, dylite-expandable-polystyrene, 1954, pp. 21-23.